US007052597B2

(12) United States Patent
Weissman et al.

(10) Patent No.: US 7,052,597 B2
(45) Date of Patent: May 30, 2006

(54) TUNING FUEL COMPOSITION FOR DRIVING CYCLE CONDITIONS IN SPARK IGNITION ENGINES

(75) Inventors: Walter Weissman, Basking Ridge, NJ (US); John T. Farrell, High Bridge, NJ (US); Alan M. Schilowitz, Highland Park, NJ (US); John E. Johnston, Warren, NJ (US); Takanori Ueda, Shizuoka (JP); Kazuhiro Akihama, Aichi (JP)

(73) Assignees: ExxonMobil Research and Engineering Company, Annandale, NJ (US); Toyota Motor Corporation, Aichi (JP)

( * ) Notice: Subject to any disclaimer, the term of this patent is extended or adjusted under 35 U.S.C. 154(b) by 0 days.

(21) Appl. No.: 09/818,210

(22) Filed: Mar. 27, 2001

(65) Prior Publication Data

US 2003/0028058 A1    Feb. 6, 2003

(51) Int. Cl.
*C10L 1/04* (2006.01)

(52) U.S. Cl. ............................ 208/15; 208/16; 208/17; 585/14

(58) Field of Classification Search .................. 208/15, 208/16, 17, 14
See application file for complete search history.

(56) References Cited

U.S. PATENT DOCUMENTS

| | | | |
|---|---|---|---|
| 2,947,687 A | 8/1960 | Lee et al. .................... 210/23 |
| 3,043,891 A | 7/1962 | Stuckey ...................... 260/674 |
| 3,556,991 A | 1/1971 | Gerhold ...................... 208/321 |
| 4,495,930 A | 1/1985 | Nakajima ................... 123/575 |
| 4,532,029 A | 7/1985 | Black et al. ................. 208/307 |
| 4,798,674 A | 1/1989 | Pasternak et al. ........... 210/640 |
| 4,802,987 A | 2/1989 | Black ......................... 210/640 |
| 4,846,977 A | 7/1989 | DeVellis et al. ............ 210/640 |
| 4,944,880 A | 7/1990 | Ho et al. .................... 210/640 |
| 4,962,271 A | 10/1990 | Black et al. ................ 585/819 |
| 4,997,906 A | 3/1991 | Thaler et al. ............... 528/275 |
| 5,019,666 A | 5/1991 | Sartori et al. .............. 585/819 |
| 5,055,631 A | 10/1991 | Sartori et al. .............. 585/819 |
| 5,288,712 A | 2/1994 | Chen ......................... 210/640 |
| 5,354,344 A | 10/1994 | Takizawa et al. ............. 44/439 |
| 5,396,019 A | 3/1995 | Sartori et al. .............. 585/819 |
| 5,498,823 A | 3/1996 | Noble et al. ................ 585/818 |
| 5,635,055 A | 6/1997 | Sweet et al. ................. 208/99 |
| 5,643,442 A | 7/1997 | Sweet et al. ............... 208/302 |
| 5,905,182 A | 5/1999 | Streicher et al. ............ 585/804 |
| 6,227,151 B1 | 5/2001 | Ma ............................ 123/430 |
| 6,308,682 B1 | 10/2001 | Ma ............................ 123/299 |

FOREIGN PATENT DOCUMENTS

| | | |
|---|---|---|
| EP | 424039 A1 | 4/1991 |
| EP | 466470 A2 | 1/1992 |
| EP | 4696469 A2 | 1/1992 |
| EP | 0530745 A1 | 10/1993 |
| EP | 583957 A2 | 2/1994 |
| JP | 05-312115 | 11/1993 |
| JP | 05312112 | 11/1993 |
| JP | 05312115 | 11/1993 |
| JP | 09068061 A2 | 3/1997 |
| JP | 000010076 | 10/1999 |
| JP | 11315733 A2 | 11/1999 |
| JP | 200179368 | 6/2000 |
| JP | 2000179368 A2 | 6/2000 |
| JP | 2000-249015 | 9/2000 |
| JP | 2000249015 | 9/2000 |
| JP | 2001-050070 | 2/2001 |
| JP | 2001050070 A | 2/2001 |
| WO | WO0029731 | 5/2000 |
| WO | WO0047697 | 8/2000 |

OTHER PUBLICATIONS

Isreal Cabasso, Organic Liquid Mixtures by Permselective Polymer Membranes 1. Selection and Characteristics of Dense Isotropic Membranes Employed In the Pervaporation Process, The Polymer Research Institute, State University of New York, College of Environmental Science and Forestry, Syracuse, New York, Ind. Eng. Chem. Prod. Res. 1983, 22, 313-319.
Literature Reference—R. Chicurel, A Dual Fuel System to Provide a Variable Octane Mixture to an Engine Universidad Nacional Autonoma de Mexico, Energy V18 N.6, 611-14, Jun. 1993.
Aaron Oakley, et al., Feasibility Study of an Online Gasoline Fractionating System For Use in Spark-Ignition Engines, SAE 2001 World Congress, Detroit, Michigan, Mar. 5-8, 2001.

*Primary Examiner*—Tam M. Nguyen
(74) *Attorney, Agent, or Firm*—Paul E. Purwin (57) ABSTRACT

Tuning fuel composition delivered to a spark ignition, internal combustion engine as a function of driving cycle conditions results in improvements in one or more of fuel efficiency and combustion emissions.

10 Claims, 12 Drawing Sheets

TUNING FUEL COMPOSITION FOR DRIVING CYCLE CONDITIONS IN SPARK IGNITION ENGINES

FIELD OF INVENTION

The present invention relates generally to engine fuel compositions and their use in port or direct fuel injection spark ignition, internal combustion engines especially those having a compression ratio (CR) of 11 or more.

BACKGROUND OF INVENTION

Both petroleum refineries and engine manufacturers are constantly faced with the challenge of continually improving their products to meet increasingly severe governmental efficiency and emission requirements, and consumers' desires for enhanced performance. For example, in producing a fuel suitable for use in an internal combustion engine, petroleum producers blend a plurality of hydrocarbon containing streams to produce a product that will meet governmental combustion emission regulations and the engine manufacturers performance fuel criteria, such as research octane number (RON). Similarly, engine manufacturers conventionally design spark ignition type internal combustion engines around the properties of the fuel. For example, engine manufacturers endeavor to inhibit to the maximum extent possible the phenomenon of auto-ignition which typically results in knocking and, potentially engine damage, when a fuel with insufficient knock-resistance is combusted in the engine.

Under typical driving situations, engines operate under a wide range of conditions depending on many factors including ambient conditions (air temperature, humidity, etc.), vehicle load, speed, rate of acceleration, and the like. Engine manufacturers and fuel blenders have to design products which perform well under such diverse conditions. This naturally requires compromise, as often times fuel properties or engine parameters that are desirable under certain speed/load conditions prove detrimental to overall performance at other speed/load conditions.

One object of this invention to provide an engine with fuels specifically designed to enhance engine performance at low and high load engine conditions.

Another object of the invention is to provide an engine with fuels specifically designed to enhance engine performance across the driving cycle.

Also, spark ignition engines are generally designed to operate at a compression ratio (CR) of 10:1 or lower to prevent knocking at high load. As is known, higher CRs, up to about 18:1, are optimum from the standpoint of maximizing the engine thermal efficiency across the load range. Compression Ratio (CR) is defined as the volume of the cylinder and combustion chamber when the piston is at Bottom Dead Center (BDC) divided by the volume when the piston is at Top Dead Center (TDC). A higher CR leads to greater thermal efficiency by maximizing the work obtainable from the theoretical Otto (engine compression/expansion) cycle. Higher CRs also lead to increased burn rates, giving a further improvement in thermal efficiency by creating a closer approach to this ideal Otto cycle. The use of high compression ratio spark ignition engines, however, is limited by insufficiently high fuel octane, as in practice it is difficult to supply a single fuel with sufficiently high octane overall to allow for a significant increase in compression ratio without having engine knocking at high loads.

Therefore, another objective of this invention is to facilitate the design of high compression ratio engines that realize greater thermal efficiency across the entire driving cycle without the problem of knocking at high load.

In theory, higher efficiency engine operation at certain moderate to high loads can be achieved by adjusting the spark ignition timing closer to the value that provides MBT spark timing. MBT is defined as minimum spark advance for best torque. Experience has shown, however, that adjusting the ignition timing to allow MBT to be reached is not practical since knocking typically occurs under conditions of moderate to high load at timings earlier than MBT with commercially available gasolines. In principle, operating with a very high octane fuel would allow running the engine at MBT across the drive cycle. We will show below that a more preferred approach is to supply the engine with a fuel that has sufficient octane to approach or operate at MBT without knocking, together with other combustion properties tailored to optimize performance.

Yet another object of the invention is to provide fuel compositions that allow adjusting the spark ignition timing closer to that which provides MBT.

Presently spark ignition engines are capable of operating with known fuels at a normalized fuel to air ratio ("$\phi$") below 1.0 under low to moderate load conditions. The normalized fuel to air ratio is the actual fuel to air ratio divided by the stoichiometric fuel to air ratio. In addition, these engines can be operated with exhaust gas recycle (EGR) as the "leaning out" diluent, at a $\phi$ of 1.0 or lower. EGR is understood to include both recycled exhaust gases as well as residual combustion gases. One challenge associated with operating the engine lean is the difficulty of establishing a rapid and complete burn of the fuel.

Another object of this invention therefore is to provide high burn rate fuel for use under lean conditions to shorten the burn duration and thereby improve the thermodynamic efficiency. A faster burn rate also serves to maximize conversion of the fuel, thereby increasing the overall fuel economy and reducing emissions. As known in the art, autoignition of the fuel at sufficiently high loads can pose a threat of mechanical damage to the engine, i.e., knocking. However, at certain low load conditions, for example lean stratified operation, autoignition of the fuel can be beneficial to overall engine operation by optimizing burn characteristics that result in reduced engine emissions and higher efficiency. An additional object of this invention, therefore is to provide a high autoignition tendency, low octane fuel. A further object is to provide a high laminar flame speed fuel.

Other objects of the invention and their attendant advantages will be apparent from the reading of this specification.

SUMMARY OF INVENTION

One aspect of the invention is the provision of a plurality of unleaded fuel compositions for use in operating a spark ignition, internal combustion engine, especially an engine having a CR of 11 or more, each of which compositions have different predetermined combustion properties suitable for use under preselected engine operating conditions to improve one or more of fuel efficiency and combustion emissions.

In one embodiment at least a first and second fuel composition is provided, the first fuel having combustion properties sufficient to improve combustion thereof under high engine load conditions and the second fuel having combustion properties sufficient to improve combustion thereof under low engine load conditions.

An especially preferred first fuel will have a RON greater than 100, and a burn rate greater than 105% of iso octane at the high load end of the cycle and a laminar flame speed of greater than 105% of iso octane measured at a temperature and pressure representative of conditions in the engine at the high end of the load scale.

Especially preferred fuels for use under low load conditions are those unleaded fuels boiling in the gasoline boiling range that have a RON less than 90 and an average burn rate in the engine, defined as 1/crank angles for 90% burn completion, >105%% of isooctane at this time in the engine operating cycle and a laminar flame speed >105%% of isooctane measured at a temperature and pressure representative of conditions in the engine at or about this time in the engine operating cycle.

Especially preferred fuels for use under low load conditions are those unleaded fuels boiling in the gasoline boiling range that have a RON less than 90 and an average burn rate in the engine, defined as 1/crank angles for 90% burn completion, >105%% of isooctane at this time in the cycle and a laminar flame speed >105%% of isooctane measured at a temperature and pressure representative of conditions in the engine at the low end of the load scale.

In view of the foregoing it will be readily appreciated that a wide range of modifications and variations of the invention are within the broad aspects set forth above and the unique scope of the invention will become even more apparent upon a reading or the detailed description which follows.

DETAILED DESCRIPTION OF INVENTION

As is well known in the art, gasoline fuels generally are composed of a mixture of hydrocarbons boiling at atmospheric pressure in the range of about 77° F. (25° C.) to about 437° F. (225° C.). Typically gasoline fuels comprise a major amount of a mixture of paraffins, cycloparaffins, olefins and aromatics, and lesser, or minor amounts of additives including oxygenates, detergents, dyes, corrosion inhibitors and the like. Typically also, gasoline fuels are formulated to have a RON of about 98 for premium grade and about 92 for regular grade and are used alone in a vehicle engine the grade used normally depending upon the vehicle manufacturer's recommendation.

The present invention departs form the practice of formulating a single fuel for a specific vehicle engine. Indeed, the present invention is based on the discovery that significant benefits can be achieved by providing a range of fuel compositions having combustion properties tailored to the engine's specific operating condition.

The fuel compositions of the invention are unleaded fuels boiling in the gasoline range and capable of being used in spark ignition, internal combustion engines especially those having a CR of 11 or higher.

In one embodiment the fuel compositions will comprise at least one first fuel and a second fuel. The first fuel will have a RON greater than 100, and a burn rate greater than 105% of isooctane at the high load end of the cycle and a laminar flame speed of greater than 105% of isooctane measured at a temperature and pressure representative of conditions in the engine at the high end of the load scale. The second fuel will have a RON less than 90, a burn rate greater than 105% of isooctane at the low end of the cycle and a laminar flame speed greater than 105% of isooctane measured at a temperature and pressure representative of conditions in the engine at the low end of the load scale.

The laminar flame speed of the fuel compositions is measured by combustion-bomb techniques that are well known in the art. See, for example, M. Metghalchi and J. C. Keck, Combustion and Flame, 38:143–154 (1980).

A particularly useful unleaded fuel for operating the engine in the high load portion of the drive cycle comprises a mixture of hydrocarbons boiling in the gasoline range with an RON>100 and containing greater than about 45 vol % aromatics and preferably greater than about 55 vol %.

A particularly useful unleaded second fuel for operating the engine in the low load portion of the drive cycle comprises a mixture of hydrocarbons boiling in the gasoline range having an RON<90 and containing less aromatics than the first fuel, for example, less than about 45 vol % aromatics and preferably less than 20 vol %.

Fuels meeting the foregoing characteristics provide efficiency benefits for various types of spark ignited internal combustion engines when operating under high load conditions. High load conditions are defined as being those regions of the engine operating map where at MBT spark timing knocking occurs with a gasoline of RON 98. Knocking is defined as autoignition under sufficiently severe in-cylinder conditions that it results in a detonation that poses a risk of mechanical damage to the engine.

In the case of port fuel injection engines, use of fuels having the properties of the first fuel above permits the engine to be designed to operate at a CR of 11 or more and permits advance spark timing closer to that for MBT. These design features enhance overall cycle efficiency, i.e., provide improved fuel economy.

More particularly these benefits are achieved with direct fuel injection engines and especially direct injection, lean burn engine systems, such as stratified charge direct injection systems. Stratified charge is an in-cylinder condition wherein there is an inhomogeneous air:fuel ratio distribution. As is known, "lean burn" engines operate at normalized fuel to air ratios ("φ") of below 1.0 and/or with exhaust gas recycle as the "leaning out" diluent, at a φ of 1.0 or lower.

Fuels having the combustion properties of the second fuel above are suitable for use especially in the operation of spark ignition engines, included stratified fuel systems, operating under low load conditions with exhaust gas recycle. Low engine load conditions are those regions of the engine operating map at or below which the engine can be operated at MBT timing with a fuel having a RON of approximately 90 without the condition of knocking as defined above.

Fuels having a range of combustion properties between the first and second fuel offer even more complete tuning of the fuel compositions to engine operating conditions. Indeed, a third fuel composition can be provided having a RON between those of the first and second fuel, and most desirably a burn rate greater than 105% of isooctane at the medium load end of the cycle and most desirably a laminar flame speed of greater than 105% of isooctane measured at a temperature and pressure representative of conditions in the engine at the medium end of the load scale. Such a fuel can be used under moderate engine load conditions, i.e., conditions wherein the octane required for MBT is less than 98 RON and more than 90 RON.

One way to achieve the benefits of the invention is by supplying the high octane fuel to an engine at the high end of the engine load scale, for example, and the low octane fuel at the low end of the engine load scale. There are many ways in which this can be accomplished. For example, two fuel tanks, one containing the first and the other containing the second fuel can be provided with the fuel supplied to the engine being based on a predetermined engine condition. The electronic control unit map will be the basis for this decision. Optionally, the first and second fuels can be blended in appropriate proportions to provide a third fuel to be supplied to the engine under moderate load conditions.

In yet another embodiment of the invention a single fuel, i.e., a regular grade gasoline of about 92 RON is stored in a vehicle primary fuel tank. Under moderate engine load conditions fuel is supplied directly to the engine. A portion of the fuel from the primary tank is also separated into two streams. Under high load conditions a first fuel stream having a RON greater than 100 and greater than 45 vol. % aromatics which is stored for use at high load conditions, is delivered to the engine. Under low load conditions, a second fuel stream of RON less than 90 and less aromatics than the first fuel which is stored in a secondary tank is supplied to the engine. Separation of the fuel into the two streams is achieved preferably by pervaporation membranes separation techniques (See for example patent EP466469 which teaches use of a polyethylene terephtalate membrane for separation of gasoline boiling range aromatics and nonaromatics under pervaporation conditions, which is incorporated herein by reference.)

In another embodiment the invention is applicable to engines that operate under high exhaust gas recycle, i.e., 20% or greater, during the low to moderate engine load.

EXAMPLES

Example 1

The effects of a high octane, high knock-resistant, high burn rate fuel on combustion efficiency and performance were investigated in an in-line 4-cylinder (2.0 L displacement) DOHC 4 valve/cylinder direct injection spark ignition engine with a shell-shaped piston cavity, a straight intake air port, and a fan-shaped fuel spray. The engine was operated at high load/wide open throttle (WOT) at a compression ratio of 13.0. The base fuel was pure iso-octane with RON=100. The test fuel, called "DF-2" was comprised of 60% toluene, 33% iso-octane, and 7% n-heptane (measured RON=103). The fuel properties are listed in Table 1. Both fuels were combusted under the following conditions: engine speed=4000 rpm, fuel/air ratio (φ)=1.15, spark advance timing=11–24 degrees before top dead center (BTDC). In this example and the others that follow, the injection quantities of the fuel are adjusted so as to maintain equivalent total heating values

TABLE 1

FUEL PROPERTIES FOR WOT TESTS

| | Test Fuel | | DF-2 | Isooctane |
|---|---|---|---|---|
| Density | | g/cm$^3$ @ 15° C. | 0.7945 | 0.694 |
| RON | | — | 103.1 | 100 |
| MON | | — | 93.2 | 100 |
| LHV | | KJ/g | | 44.4 |
| H/C | | mol/mol | 1.553 | 2.25 |
| Aromatics | | vol % | 60 | 0 |
| A/F stoich | | | | 15.1 |
| Viscosity | | mm$^2$/s @ 30° C. | 0.569 | |
| Distillation | IBP | ° C. | 98.5 | 99 |
| | T5 | ° C. | 102.0 | 99 |
| | T10 | ° C. | 102.0 | 99 |
| | T20 | ° C. | 102.5 | 99 |
| | T30 | ° C. | 103.0 | 99 |
| | T40 | ° C. | 103.0 | 99 |
| | T50 | ° C. | 103.5 | 99 |
| | T60 | ° C. | 104.0 | 99 |
| | T70 | ° C. | 104.5 | 99 |
| | T80 | ° C. | 105.0 | 99 |
| | T90 | ° C. | 106.5 | 99 |
| | T95 | ° C. | 107.5 | 99 |
| | EP | ° C. | 109.5 | 99 |

Figure 1:
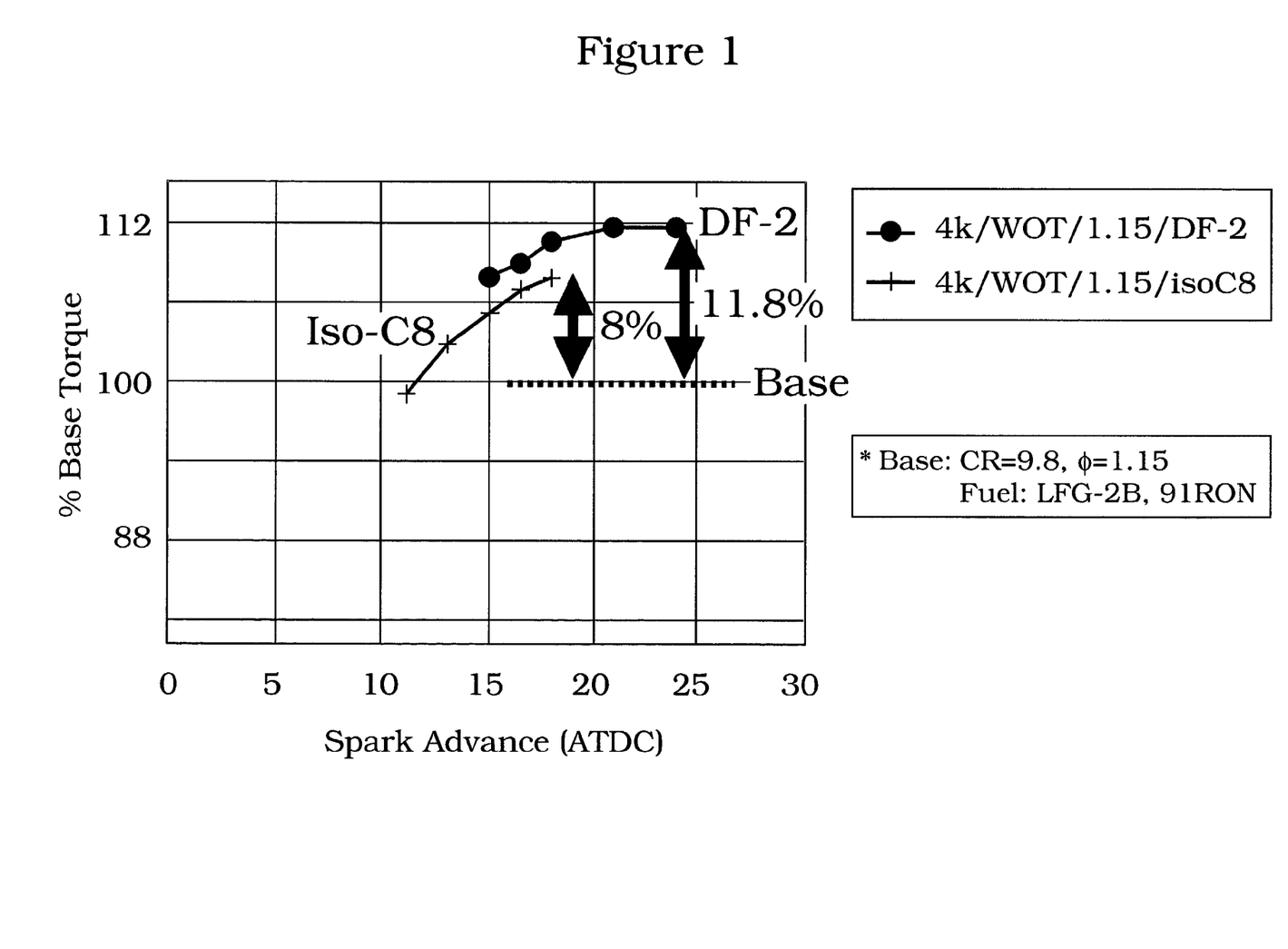
FIG. 1 demonstrates the effect of fuel composition and compression ratio on output torque for a fuel of the invention compared to isooctane.

The effect of higher compression ratio on output torque is shown in FIG. 1. Comparison of the "base" and iso-octane data shows that the peak engine torque is 8% higher at a compression ratio of 13.0 vs. 9.8. The engine operation for iso-octane is limited to a spark advance of ~18 degrees BTDC due to a knock limitation. Comparison of the DF-2 data to the iso-octane data shows that not only can the spark advance be set early enough to reach a plateau in the engine torque output i.e., operate at MBT but at the same spark advance, there is a significant torque benefit for fuel DF-2 vs. iso-octane. The combination of higher compression ratio and fuel-derived benefits leads to significant improvement in overall torque of 11.8%.

Figure 2:
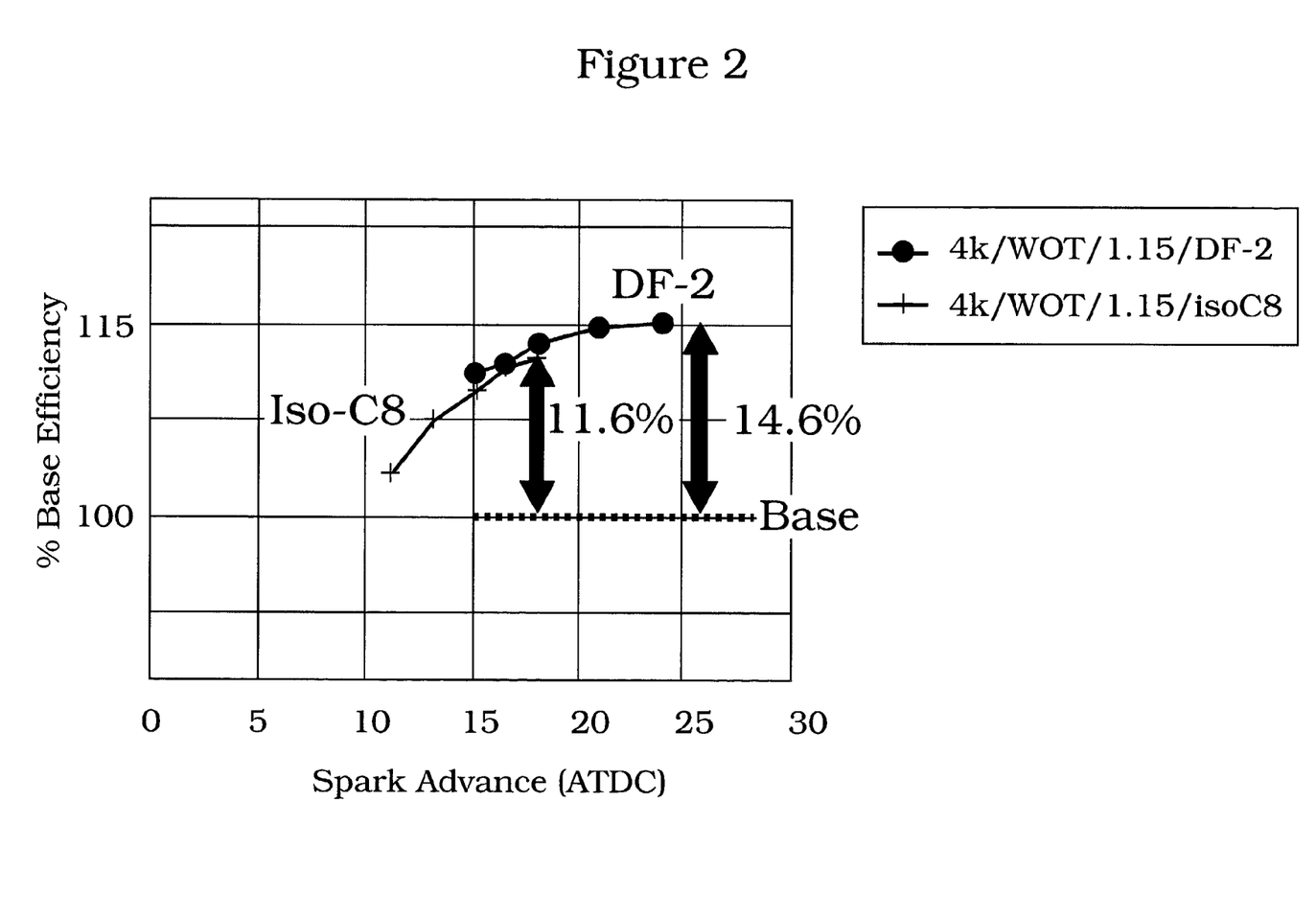
FIG. 2 compares relative engine brake efficiency vs. spark advance for isooctane and one fuel of the invention.

FIG. 2 shows the engine brake efficiency vs. spark advance for iso-octane and fuel DF-2. Comparison of the base and iso-octane data shows that the increase in compression ratio from 9.8 to 13.0 enabled by operating on isooctane raises the relative efficiency by ~11.6%. The high octane DF-2 allows the engine to be operated at a sufficiently early spark advance to reach MBT at 13 CR giving an added benefit over that for isooctane. The overall benefit associated with using the high octane fuel DF-2 is an increase in relative brake efficiency of ~14.6%.

Figure 3:
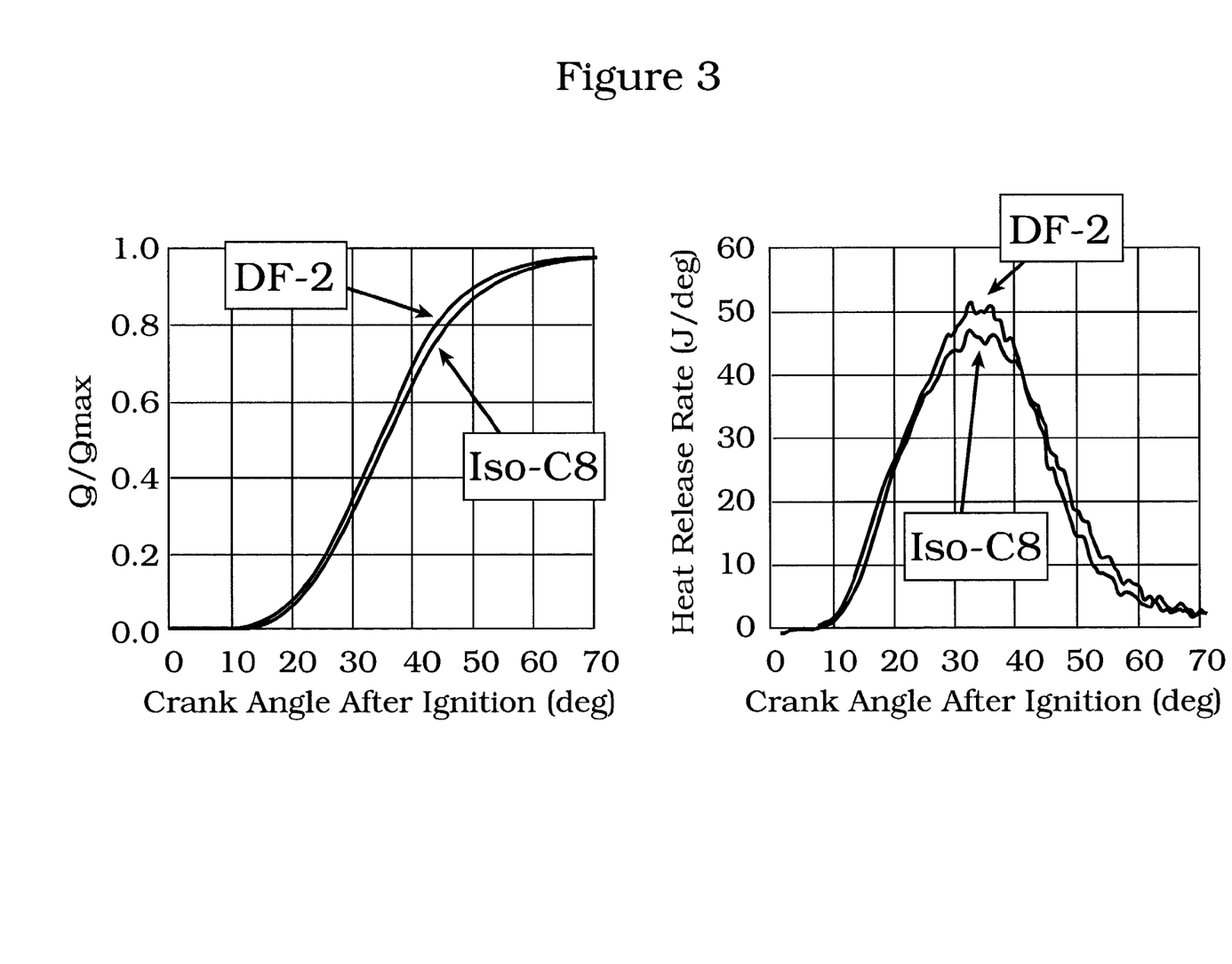
FIG. 3 are graphs of B burn rate and heat release rate that compares burn curves for isooctane and one fuel of the invention.

FIG. 3 shows burn curves for both iso-octane and fuel DF-2, from which it can be seen that fuel DF-2 exhibits a faster heat release rate (right figure). This is corroborated by the data in the table at the bottom of the figure, which shows that fuel DF-2 takes fewer engine crank angles to reach both 50% and 90% burn. This faster burn releases more energy near top dead center, resulting in higher efficiency.

The benefits of the high octane fuel DF-2 are identified in the following table.

TABLE 2

| Fuel | % Credit in Torque | % Credit in Efficiency |
|---|---|---|
| Regular Gas | — | — |
| Iso-octane | 7.8 | 11.6 |
| DF-2 | 11.8 | 14.6 |

Example 2

The effects of a low octane, low autoignition-resistant, high burn rate fuel on combustion efficiency and performance were investigated the same in-line 4-cylinder (2.0 L displacement) DOHC 4 valve direct injection spark ignition engine described in Example 1. The engine was operated at various low and moderate load conditions at a compression ratio of 9.8 and 13.0. The base fuel was a commercial Japanese regular gasoline, named LFG-2B, with a RON value of 91.7. The low octane test fuel, named DF-1, was comprised of 68% iso-octane, 22% n-heptane, and 10% toluene (measured RON=83.8). The fuel properties are shown in Table 3:

TABLE 3

| | | Fuel Properties | | | |
|---|---|---|---|---|---|
| | | DF-1 | | | |
| Test Fuel | | Measured | Calculated | RON91 | LFG-2B |
| Density | p/cm3 @ 15 C. | 0.7091 | 0.7094 | 0.6931 | 0.7358 |
| RON | — | 83.8 | 807 | 91 | 91.7 |
| NON | — | 82.2 | ? | 91 | 82.7 |
| LHV | k/g | | 43.91 | 44.5 | 43.0 |
| H/C | mol/mol | 2.154 | 2.112 | 2.25 | 1.87 |
| A/F stoich | | | 14,900 | 15.1 | 14.7 |
| Viscosity | mm 2/s @ 30 C. | 0.603 | | | |
| Distillation | | | | | |
| IBP | Deg C. | 95.0 | | Approx. 99 | 31.6 |
| T5 | Deg. C. | 98.0 | | | 42.5 |
| T10 | Deg C. | 98.0 | | | 50.5 |
| T20 | Deg C. | 98.5 | | | 62.0 |
| T30 | Deg C. | 98.5 | | | 72.5 |
| T40 | Deg C. | 98.5 | | | 85.5 |
| T50 | Deg C. | 98.5 | | | 101.0 |
| T60 | Deg C. | 98.5 | | | 114.5 |
| T70 | Deg C. | 98.5 | | | 127.5 |
| T80 | Deg C. | 98.5 | | | 144.5 |
| T90 | Deg C. | 98.5 | | | 157.0 |
| T95 | Deg C. | 98.5 | | | 164.5 |
| BP | Deg C. | 120.0 | | Approx. 99 | 178.8 |
| Aromatics | vol % | 10 | | 0 | 28.7 |

Figure 4:
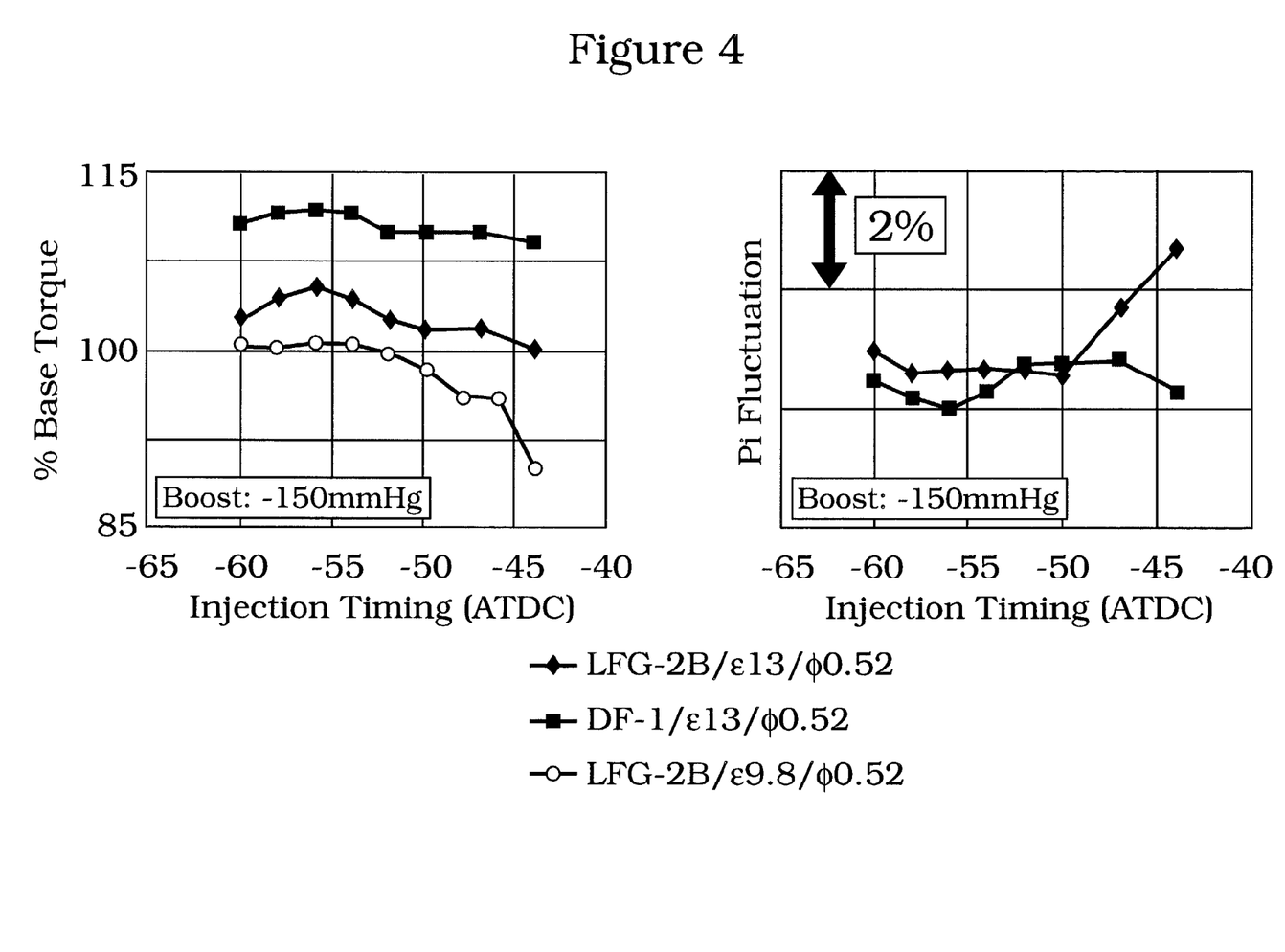
FIG. 4 demonstrates the effect on output torque of fuel composition and compression ratio at various injection timings for a fuel of the invention compared to reference fuel LFG-2B FIG. 5 demonstrates emission benefits obtained by the invention.
Figure 5:
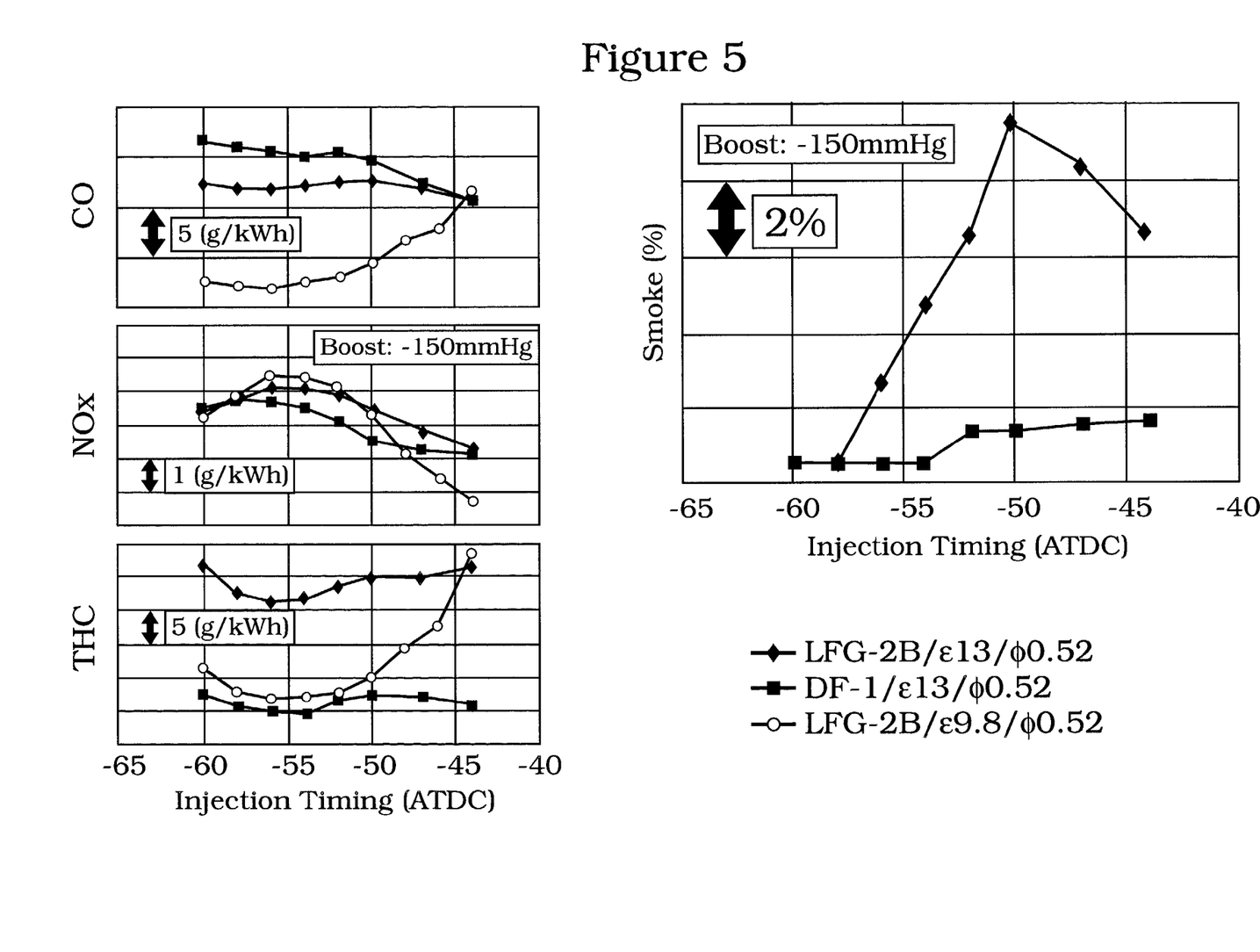
Figure 6:
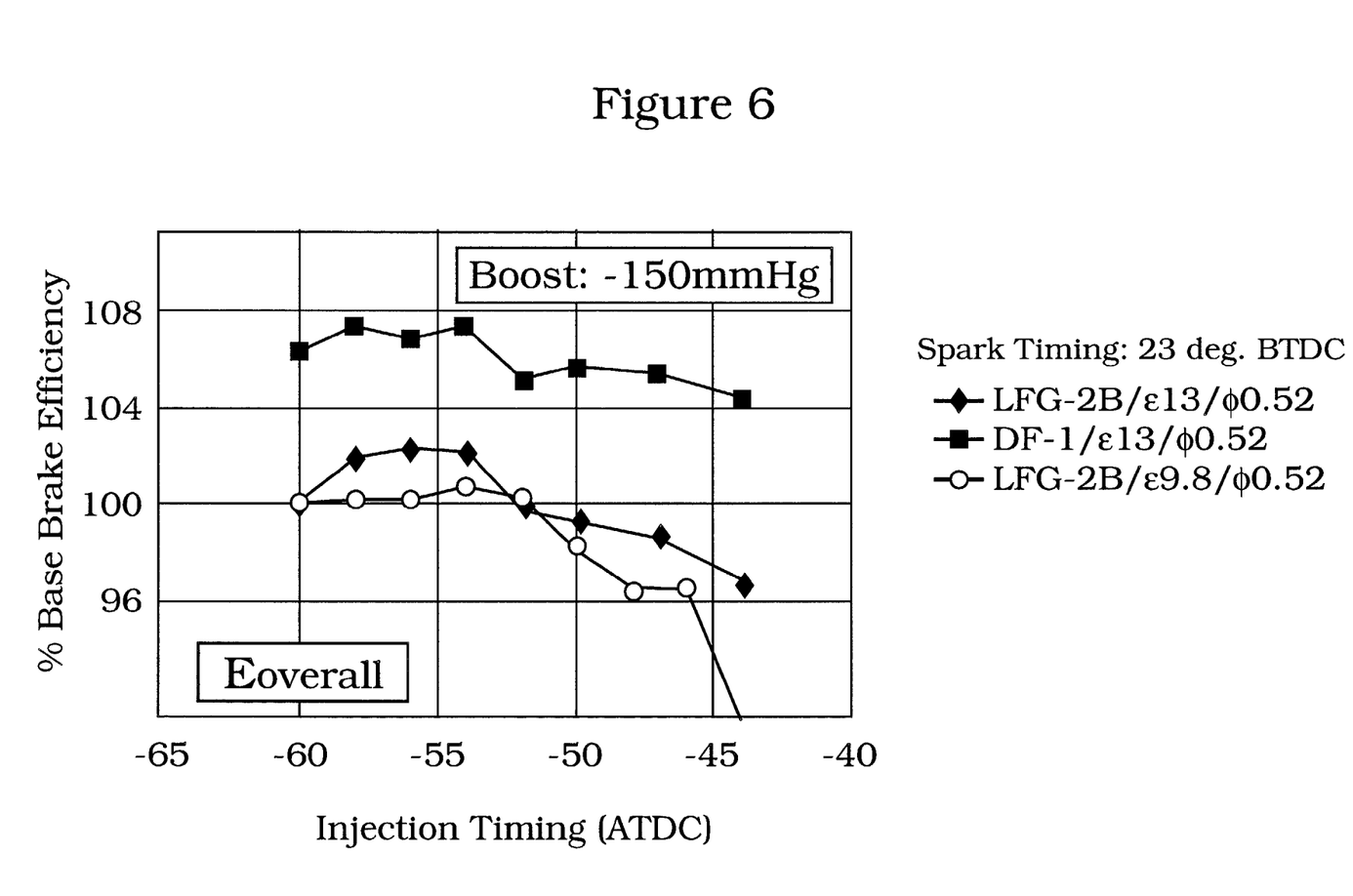
FIG. 6 demonstrates the effect of higher compression ratio and fuel composition on output torque for a fuel of the invention compared to reference fuel LFG-2B.

A comparison of torque output vs. injection timing is shown in FIG. 4 for fuel DF-1 and the base fuel LFG-2B at engine conditions of 1200 rpm and fixed spark timing=23 degrees BTDC. Significantly higher torque values (left figure) and generally lower torque fluctuations (right figure) are realized with fuel DF-1. The DF-1 fuel also generates significantly lower $NO_x$, HC, and smoke emissions (see FIG. 5). The effect of compression ratio on efficiency is shown in FIG. 6, which shows brake efficiency vs. injection timing for LFG-2B at CR=9.8 (base) and 13.0. The overall boost in relative efficiency realized by higher CR operation is ~1.5%. The effect of fuel composition on overall relative efficiency even larger than this, as is shown in FIG. 6. The relative efficiency increase associated with combusting DF-1 vs. LFG-2B is ~5.5%, for an overall relative efficiency gain of 7%. The relative efficiency benefits are summarized in Table 4.

TABLE 4

| Fuel | % Credit in Relative Efficiency |
|---|---|
| LFG-2B (CR = 9.8) | — |
| LFG-2B (CR = 13) | 1.5 |
| DF-1 (CR = 13) | 5.5 |
| Total | 7.0 |

Figure 7:
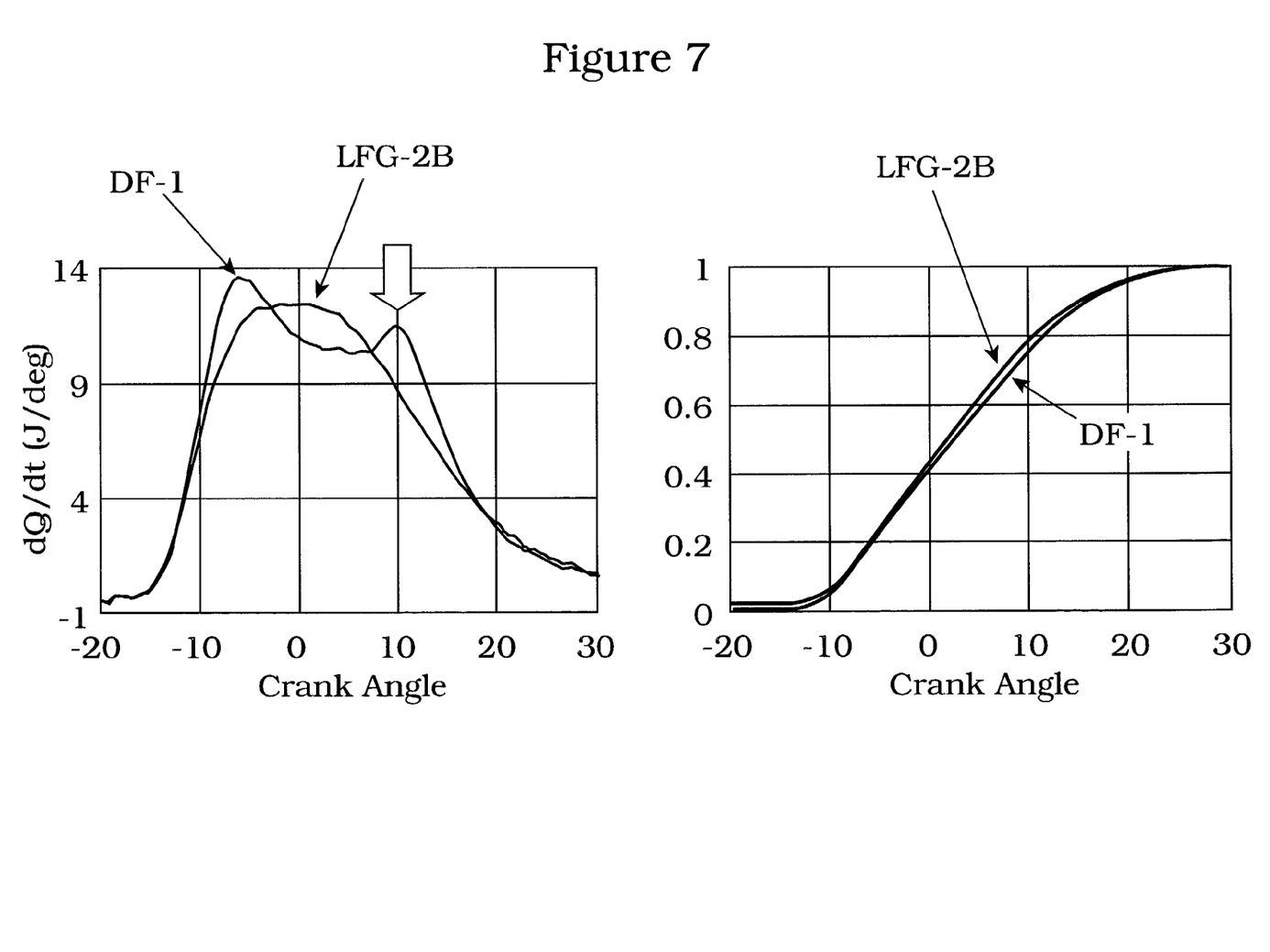
FIG. 7 compares burn curves for reference fuel LFG-2B and one fuel of the invention.

FIG. 7 shows the burn curves for DF-1 and LFG-2B at identical injection and spark advance timings of Spark Timing: 23 degrees BTDC, Injection Timing: 54 degrees BTDC. As can be seen, the burn curve for Fuel DF-1 shows two states of heat release. This heat release behavior is indicative of multipoint autoignition that occurs with the lower octane fuels. Even though the overall average burn rate for these fuels is comparable, both fuels being relatively high in burn rate, the data showing higher efficiency and lower emissions demonstrate the importance of maintaining low RON to get the benefits of autoignition.

Example 3

The effects of a low octane, low autoignition-resistant, high burn rate fuel on combustion efficiency and performance have been investigated at a different region of the driving cycle in the same in-line 4-cylinder (2.0 L displacement) DOHC 4 valve direct injection spark ignition engine described in Examples 1 and 2. The engine was operated at an engine speed of 3000 rpm and fuel/air ratio of $\phi=0.56$, which is located on a different part of the speed/load map than the engine conditions described in Example 2. The engine was operated at a compression ratio of 9.8 and 13.0. The base fuel was a commercial Japanese regular gasoline, named LFG-2B, with a RON value of 91.7. The low octane test fuel, named DF-1, is the same fuel described in Example 2, and is comprised of 68% iso-octane, 22% n-heptane, and 10% toluene (measured RON=83.8). The fuel properties are shown in Table 3: As was observed under the engine operating conditions of Example 2, significantly lower $NO_x$ and smoke emissions are observed with Fuel DF-1 than with the base fuel LFG-2B (see FIG. 8).

Figure 8:
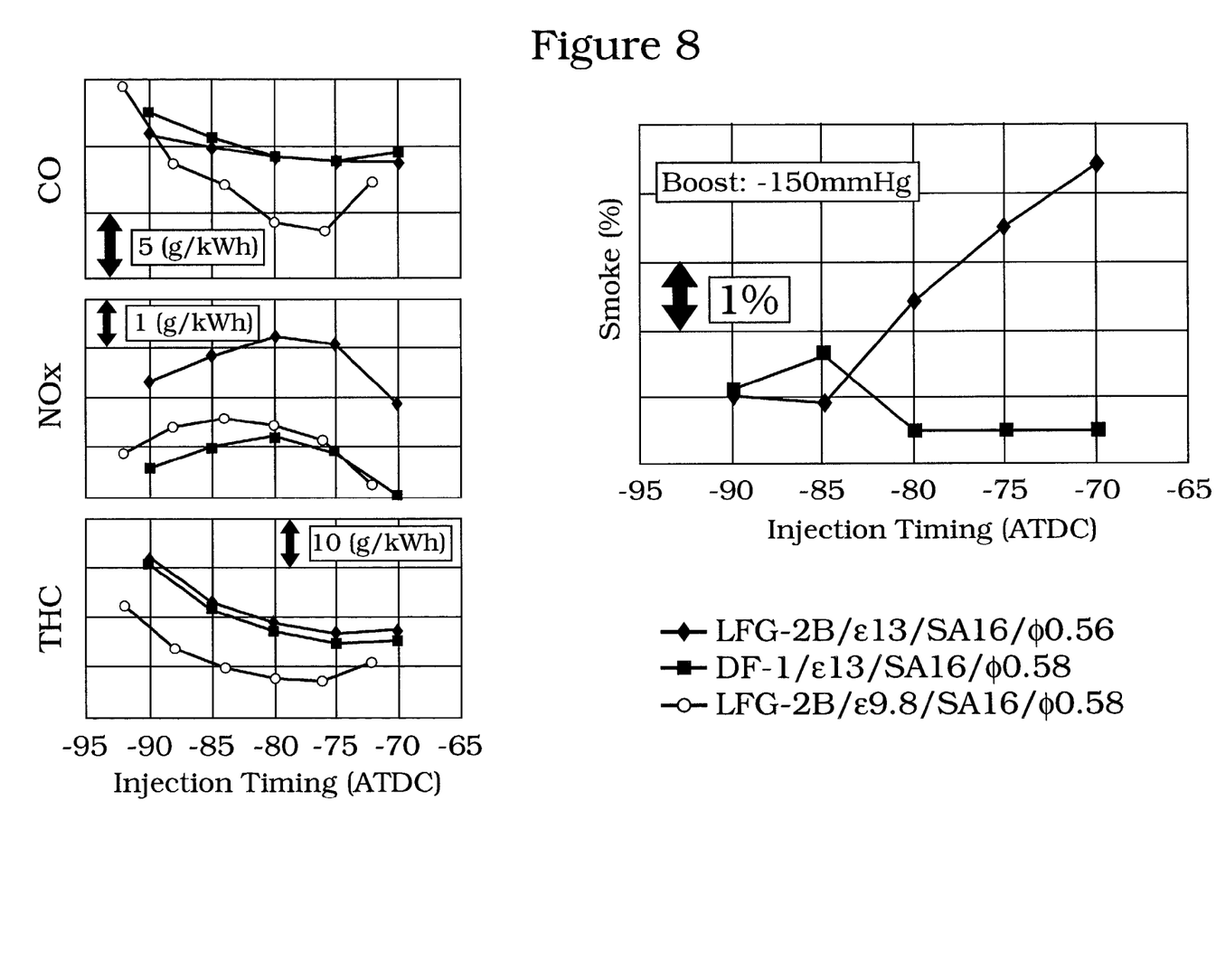
FIG. 8 demonstrates emission benefits obtained by the invention.
Figure 9:
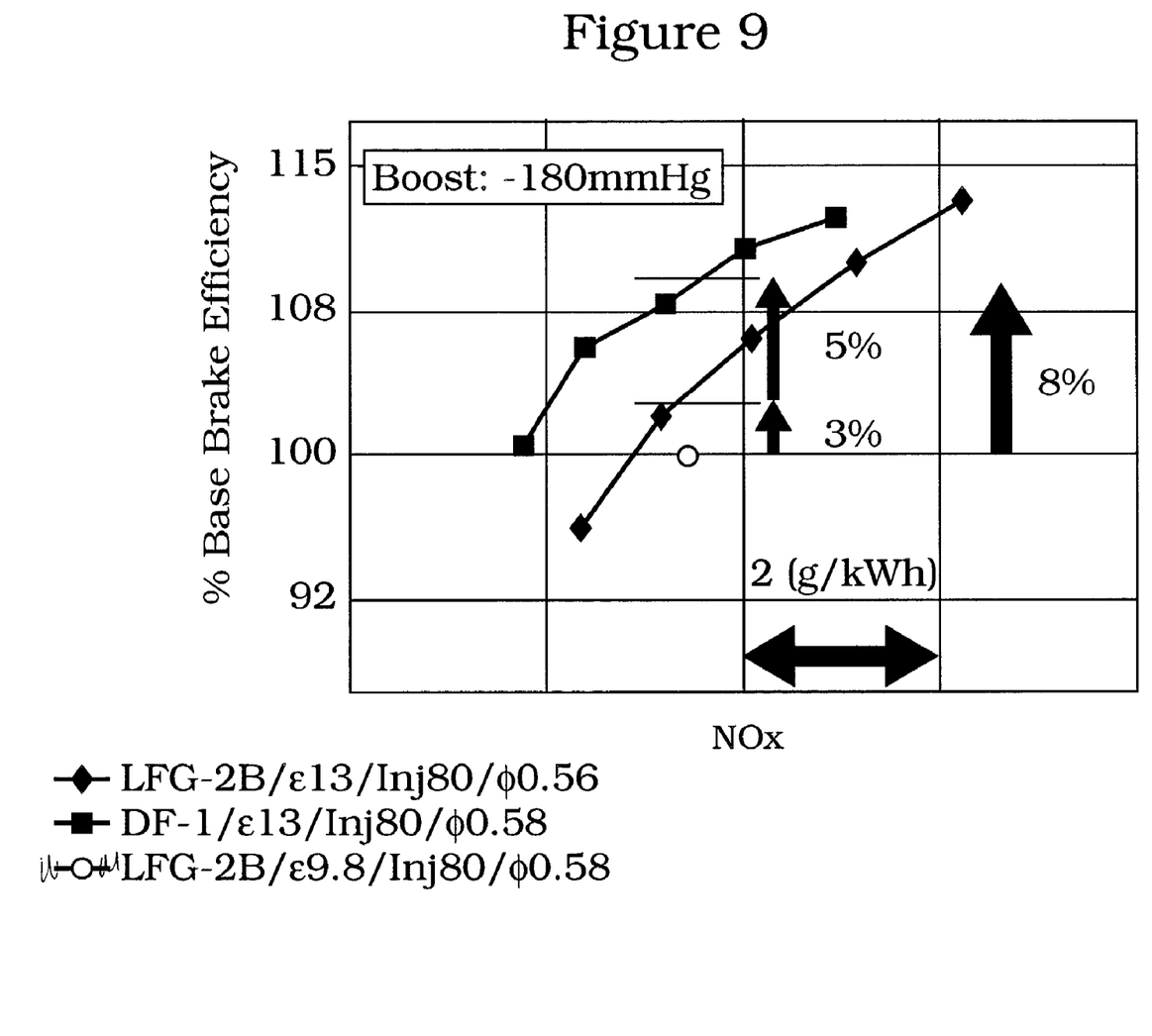
FIG. 9 compares engine brake efficiency at constant NOx emissions for reference fuel LFG-2B and one fuel of the invention.

The effect of compression ratio on relative efficiency is shown in FIG. 9, which shows relative brake efficiency vs. injection timing for LFG-2B at CR=9.8 (base) and 13.0. The overall boost in relative efficiency realized by higher CR operation is ~3%. The effect of fuel composition on overall relative efficiency is even larger than this, as is shown in FIG. 8. The relative efficiency increase associated with combusting DF-1 vs. LFG-2B is ~5%, for an overall relative efficiency gain of 8%. The relative efficiency benefits are summarized in Table 5.

TABLE 5

| Fuel | % Credit in Relative Efficiency |
|---|---|
| LFG-2B (CR = 9.8) | — |
| LFG-2B (CR = 13) | 3 |
| DF-1 (CR = 13) | 5 |
| Total | 8 |

Example 4

Figure 10:
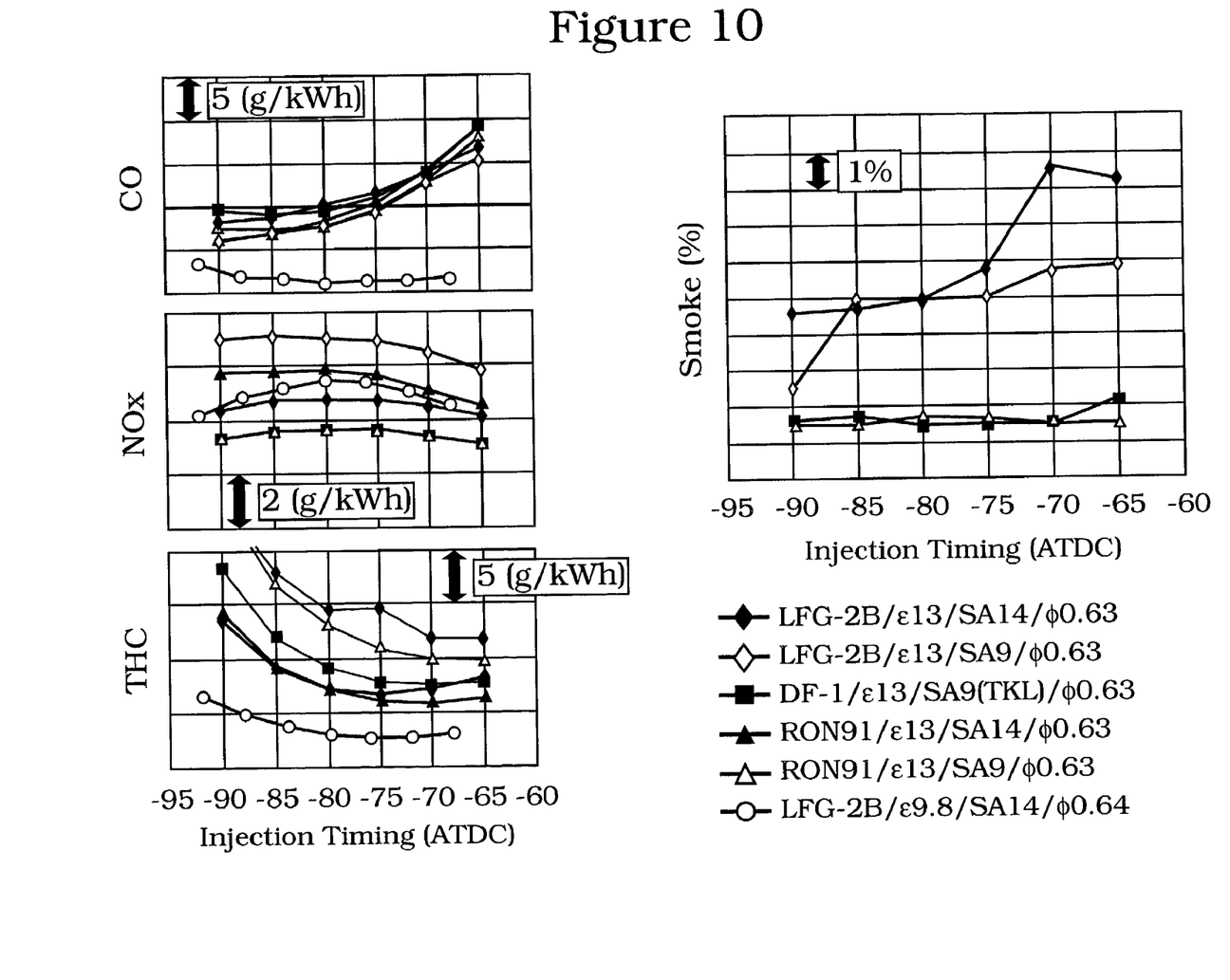
FIG. 10 compares emissions data for one fuel of this invention reference fuels LFG-2B and RON91 at a medium load condition.

The effects of fuel octane and autoignition-resistance on combustion efficiency and performance have been investigated at medium load in the same in-line 4-cylinder (2.0 L displacement) DOHC 4 valve direct injection spark ignition engine described in Examples 1–3. The engine was operated at an engine speed of 2400 rpm and fuel/air ratio of $\phi=0.63$, which is located on a different part of the speed/load map than the engine conditions described in Example 2 and 3. The engine was operated at a compression ratio of 9.8 and 13.0. Two base fuels were used in this study; the first was a commercial Japanese regular gasoline, named LFG-2B, with a RON value of 91.7. The second was a blend of 91% iso-octane and 9% n-heptane, named RON91, with a RON value of 91. The low octane test fuel, named DF-1, is the same fuel described in Example 2 and 3, and is comprised of 68% iso-octane, 22% n-heptane, and 10% toluene (measured RON=83.8). The fuel properties are shown in Table 3. As was observed under the engine operating conditions of Example 2 and 3, significantly lower NOx and smoke emissions are observed with Fuel DF-1 than with the base fuel LFG-2B (see FIG. 10).

Figure 11:
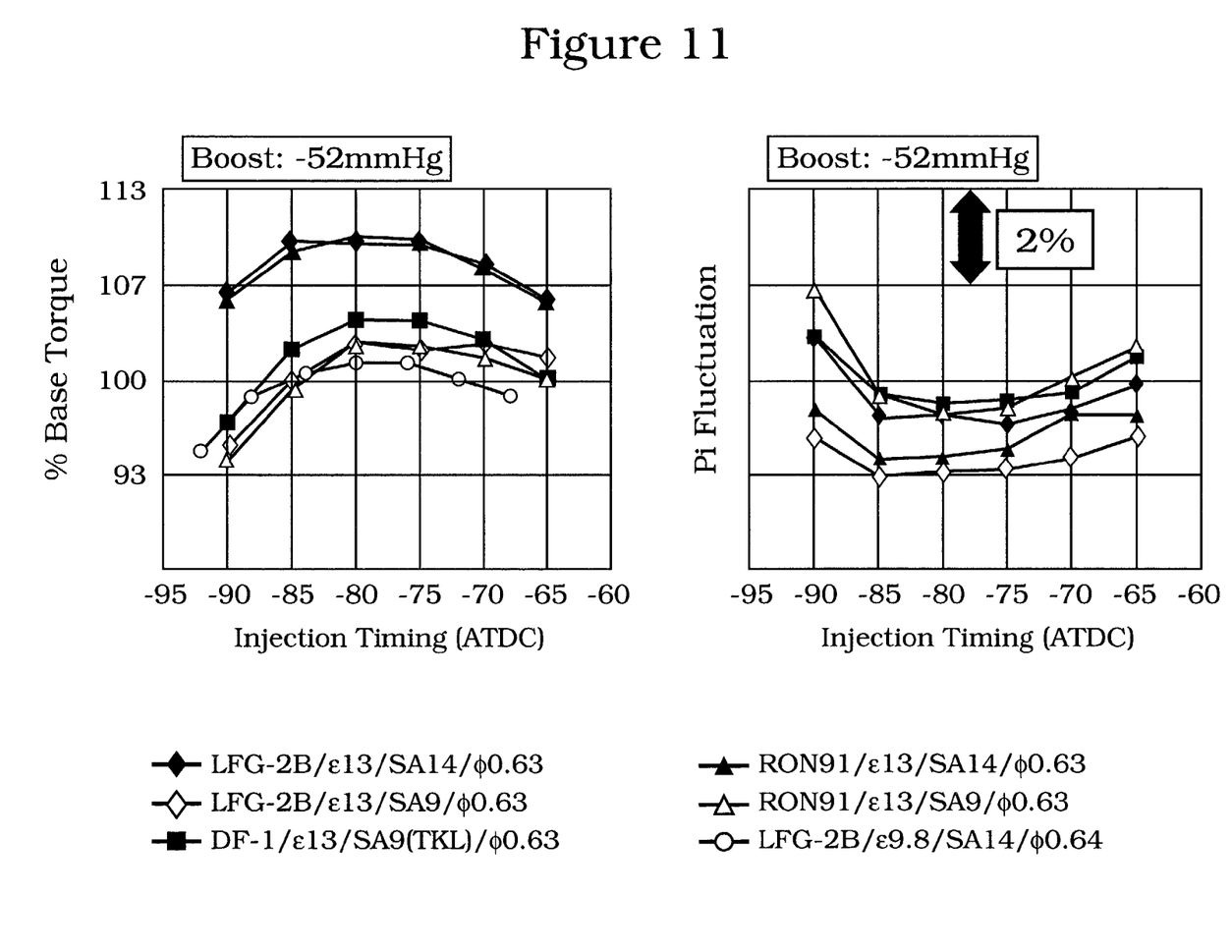
FIG. 11 demonstrates the effect of fuel composition and compression ratio on relative output torque for a fuel of the invention compared to reference fuels LFG-2B and RON91
Figure 12:
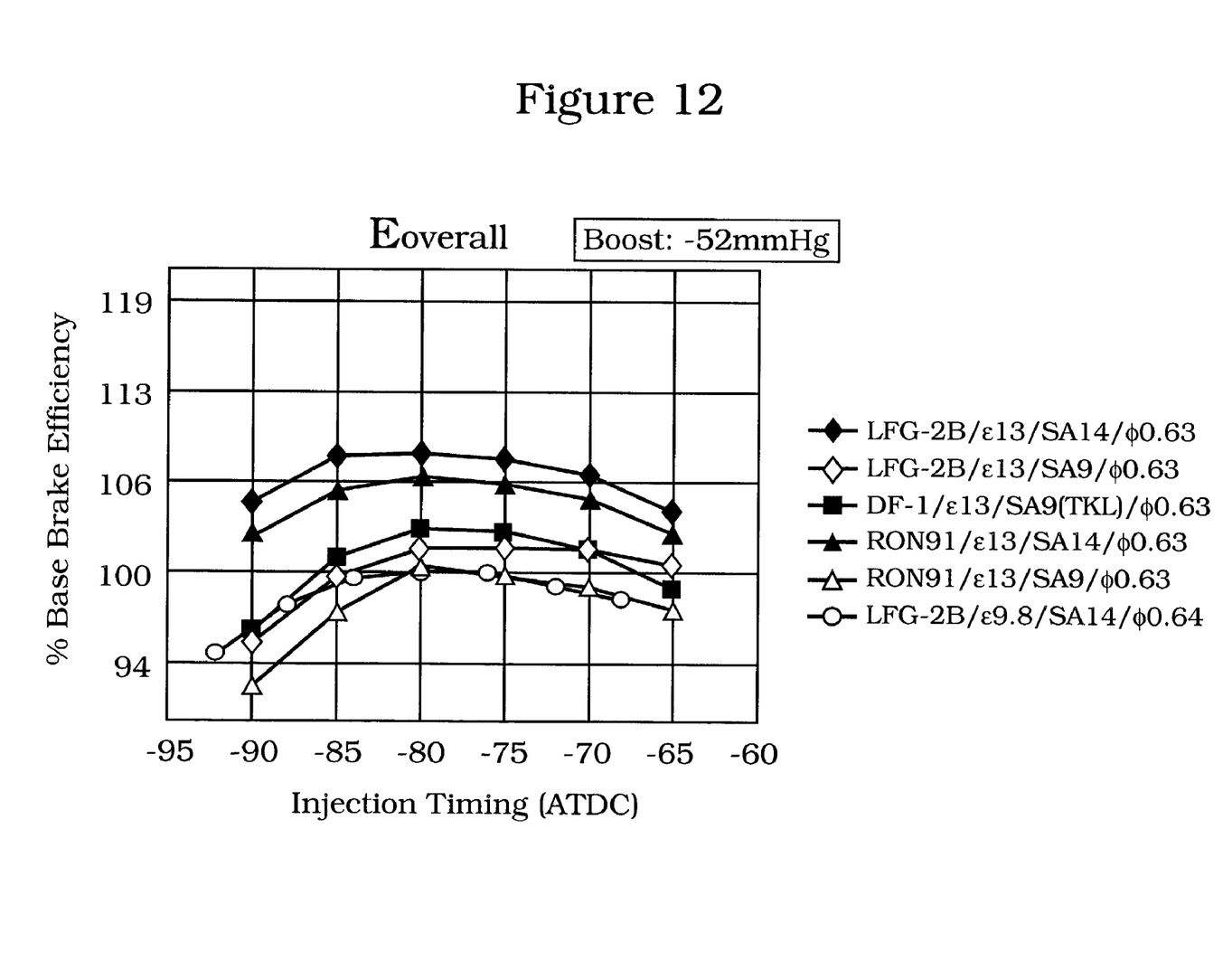
FIG. 12 demonstrates relative fuel efficiency improvements obtained by the invention.

The effect of compression ratio on torque output is shown in FIG. 11, which shows relative torque output vs injection timing for LFG-2B at CR=9.8 and 13.0. Also shown are data for RON91 and DF-1. Unlike the two previous examples, the low octane fuel DF-1 has lower relative torque output than the higher octane fuels. Similarly, the engine relative efficiency is lower with the low octane fuel DF-1 than with RON91 and LFG-2B (see FIG. 12). The reason for the diminished performance is that the engine cannot operate with the low octane fuel DF-1 with spark advance timings that approach MBT due to knock limitations. These data demonstrate that at intermediate loads, fuel properties (octane levels and composition) more commensurate with conventional gasoline are more suitable than the low octane fuels (such as fuel DF-1).

Example 5

The effects of a low octane, low autoignition-resistant, high burn rate fuel on combustion efficiency and performance have been investigated in an in-line 4-cylinder (2.0 L displacement) DOHC 4 valve direct injection spark ignition engine similar to the engine described in Examples 1–4. Then engine had a swirl injector rather than the fan spray injector described in Examples 1–4 and was operated at a lower compression ratio of 10.3. The engine was operated at an engine speed of 1200 rpm and fuel/air ratio of $\phi=0.5$. The base fuel was 100% iso-octane (RON=100) and several low octane test fuels were studied, i.e., n-hexane (RON=25), 2-methylpentane (RON=69), and cyclohexane (RON=84).

Burn curves for these fuels are shown in FIG. 13. Several observations are noteworthy. First, the burn curve for n-hexane is the most rapid and reaches 80% burn completion much quicker than the other fuels. By virtue of this, the overall efficiency is 8% higher than iso-octane. Second, the $NO_x$ levels for n-hexane are much lower than iso-octane. This reflects the very fast heat release, and the tendency to form less $NO_x$ when the combination of high temperature and time is minimized. Third, relative efficiency benefits similar to those identified for n-hexane are observed with the other two low octane fuels, i.e., 2-methylpentane and cyclohexane, where credits of 2% and 6% are observed, respectively. The high relative efficiency of these low octane fuels reflects the fast burn rates of the low octane fuels. This high burn rate has two primary contributing factors, i) high laminar flame speed, and ii) controlled autoignition. High laminar flame speed is the primary factor responsible for the high relative efficiency of cyclohexane, while autoignition is likely to be the main factor responsible for the increased relative efficiency of n-hexane and 2-methylpentane. This is evident in FIG. 14, which shows heat release curves for these fuels. The very rapid heat release for n-hexane is postulated to originate from multipoint autoignition initiated by end gas compression from the flame front and piston movement. It is worth noting that under these conditions, autoignition does not generate the heat release levels typically encountered under knocking conditions at higher load, and thus no deleterious effects associated with autoignition are observed.

It is important to note that while these data were obtained in an engine with a compression ratio of 10:1, the benefits of low octane are expected to be realized at higher CR as well. This was demonstrated in Examples 2 and 3, where increasing the CR from 9.8 to 13 led to higher efficiency at all loads and speeds. The further lo efficiency and emission benefits observed for these examples with the low octane fuel are also expected to realized with these fuels in a higher CR engine under similar operating conditions.

What is claimed is:

1. A plurality of fuels comprising:
at least a first unleaded fuel and a second unleaded fuel, each boiling in the gasoline range and operable in a spark ignition, internal combustion engine having a compression ratio, CR, of 11 or more,
the first fuel being a mixture of hydrocarbons with greater than 45 vol % aromatics and having a research octane number, RON, greater than 100, and at high load conditions an average burn rate greater than 105% of isooctane and a laminar flame speed greater than 105% of isooctane;
the second fuel being a mixture of hydrocarbons having a research octane number, RON, less than 90, and at low load conditions a burn rate greater than 105% of isooctane and a laminar flame speed greater than 105% of isooctane and containing less than 45 vol % aromatics.

2. The fuels of claim 1 including at least a third fuel having a research octane number, RON, between those of the first and second fuel, and at medium load conditions a burn rate greater than 105% of isooctane and a laminar flame speed greater than 105% of isooctane.

3. The fuels of claim 2 wherein the third fuel is admixed from the first and second fuel.

4. The fuels of claim 2 wherein the admixture functions to allow engine operation at or about minimum spark advance for best torque, MBT.

5. The fuels of claim 2 wherein the third fuel functions to allow engine operation at or about minimum spark advance for best torque, MBT.

6. The fuel composition of claim 1 wherein the concentration of sulfur in the second fuel is lower than the concentration of sulfur in the first fuel.

7. The fuels of claim 1 wherein the second fuel has less than about 20 vol % aromatics.

8. At least two unleaded fuel compositions boiling in the gasoline range comprising: at least a first fuel and a second fuel operable in a spark ignition, internal combustion engine having a compression ratio of 11 or more, the first fuel having a research octane ratio, RON, greater than 100, a flame speed greater than 105% of isooctane and at high load conditions an average burn rate greater than 105% of isooctane and greater than 45 vol. aromatics, the second fuel having a research octane ratio, RON, less than 90 and aromatics less than the first fuel and a laminar flame speed 105% of isooctane and at low load conditions an average burn rate greater than 105% of isooctane.

9. The fuel compositions of claim 8 wherein said first fuel has greater than about 55 vol % aromatics.

10. The fuel composition of claim 9 wherein said first fuel has about 60 vol % aromatics.

* * * * *